US012566816B2

(12) United States Patent
Arechiga Gonzalez et al.

(10) Patent No.: US 12,566,816 B2
(45) Date of Patent: Mar. 3, 2026

(54) SYSTEMS AND METHODS FOR DETERMINING A SYMBOLIC EXPRESSION FROM DATA USING REGRESSIVE MODELING

(71) Applicant: Toyota Research Institute, Inc., Los Altos, CA (US)

(72) Inventors: Nikos Arechiga Gonzalez, San Mateo, CA (US); Rumen Iliev, Millbrae, CA (US); Francine Chen, Menlo Park, CA (US); Yin-ying Chen, San Jose, CA (US); Kent Lyons, Los Altos, CA (US); Yanxia Zhang, Foster City, CA (US); Heishiro Toyoda, Mountain View, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 917 days.

(21) Appl. No.: 17/732,647

(22) Filed: Apr. 29, 2022

(65) Prior Publication Data

US 2023/0177114 A1 Jun. 8, 2023

Related U.S. Application Data

(60) Provisional application No. 63/285,761, filed on Dec. 3, 2021.

(51) Int. Cl.
*G06N 3/08* (2023.01)
*G06F 18/214* (2023.01)
(Continued)

(52) U.S. Cl.
CPC ........... *G06F 18/214* (2023.01); *G06N 3/048* (2023.01); *G06F 2218/02* (2023.01)

(58) Field of Classification Search
CPC ... G06F 18/214; G06F 2218/02; G06N 3/048; G06N 3/045; G06N 3/08; G06N 7/01
See application file for complete search history.

(56) References Cited

U.S. PATENT DOCUMENTS

| | | | |
|---|---|---|---|
| 11,232,357 B2 * | 1/2022 | Dalli | G06N 3/0464 |
| 2025/0102582 A1 * | 3/2025 | Goshtasbi | B64D 31/16 |
| 2025/0293536 A1 * | 9/2025 | Rimstidt | H02J 7/00712 |

FOREIGN PATENT DOCUMENTS

| | | |
|---|---|---|
| CN | 104317582 A | 1/2015 |
| WO | 03081453 A1 | 10/2003 |

OTHER PUBLICATIONS

Kusner et al., "Grammar Variational Autoencoder," Proceedings of the 34th International Conference on Machine Learning, vol. 70, 2017, pp. 1945-1954.

(Continued)

*Primary Examiner* — Etienne P Leroux
(74) *Attorney, Agent, or Firm* — Christopher G. Darrow; Darrow Mustafa

(57) ABSTRACT

System, methods, and other embodiments described herein relate to a manner of determining an interpretable model from experimental data using tokenization in a prediction model. In one embodiment, a method includes outputting a bit pattern of probable tokens generated from raw data using a model. The method also includes converting, using the model, the bit pattern into output tokens and parsing the output tokens into a symbolic expression. The method also includes fitting symbolic parameters from the symbolic expression into an interpretable model for accuracy. The method also includes estimating an operational behavior and signal output of a vehicle system according to the interpretable model.

20 Claims, 5 Drawing Sheets

(51) Int. Cl.
    *G06N 3/045*      (2023.01)
    *G06N 3/048*      (2023.01)
    *G06N 7/01*       (2023.01)

(56)          References Cited

OTHER PUBLICATIONS

Cranmer et al., "Discovering Symbolic Models from Deep Learning with Inductive Biases," 34th Conference on Neural Information Processing Systems, NeurIPS 2020, pp. 1-14.

Brence et al., "Probabilistic Grammars for Equation Discovery," Knowledge-Based Systems, vol. 224, Jul. 19, 2021, pp. 1-39.

Brunton et al., "Discovering Governing Equations from Data by Sparse Identification of Nonlinear Dynamical Systems," Proceedings of the National Academy of Sciences, vol. 113, No. 15, 2016, pp. 3932-3937.

Renáta Dubčáková, "Eureqa: Software Review," Genetic Programming and Evolvable Machines, vol. 12, 2011, pp. 173-178.

Iten et al., "Discovering Physical Concepts with Neural Networks," Physical Review Letters, vol. 124, Jan. 23, 2020, pp. 1-18.

Pitzer et al., "Smooth Symbolic Regression: Transformation of Symbolic Regression into a Real-Valued Optimization Problem," Eurocast 2015, Lecture Notes in Computer Science, vol. 9520, pp. 375-383.

Quade et al., "Sparse Identification of Nonlinear Dynamics for Rapid Model Recovery," Chaos: An Interdisciplinary Journal of Nonlinear Science, vol. 28, issue 6, 2018, pp. 1-10.

Searson et al., "GPTIPS: An Open Source Genetic Programming Toolbox for Multigene Symbolic Regression," Proceedings of the International MultiConference of Engineers and Computer Scientists, vol. 1, Mar. 2017, pp. 77-80.

Udrescu et al., "AI Feynman: A Physics-Inspired Method for Symbolic Regression," Science Advances, vol. 6, No. 16, Apr. 15, 2020, pp. 1-16.

Haider et al., "Using Shape Constraints for Improving Symbolic Regression Models," arXiv:2107.09458, Jul. 20, 2021, pp. 1-32.

Devvrit et al., "Semi-supervised Active Regression," arXiv:2106.06676, Jun. 12, 2021, pp. 1-21.

Kahneman et al., "Prospect Theory: An Analysis of Decision Under Risk," Econometrica, vol. 42, issue 2, 1979, pp. 263-290.

Yu et al., "Steeper discounting of delayed rewards in schizophrenia but not first-degree relatives," Psychiatry Research, vol. 252, 2017, pp. 303-309.

* cited by examiner

100

SYSTEMS AND METHODS FOR DETERMINING A SYMBOLIC EXPRESSION FROM DATA USING REGRESSIVE MODELING

CROSS-REFERENCE TO RELATED APPLICATIONS

This application claims benefit of U.S. Provisional Application No. 63/285,761, filed on, Dec. 3, 2021, which is herein incorporated by reference in its entirety.

TECHNICAL FIELD

The subject matter described herein relates, in general, to determining symbolic expressions from experimental data, and, more particularly, to determining an interpretable model from the experimental data and observations using tokenization in a model.

BACKGROUND

Equations can represent the behavior of scientific phenomena. Deriving an equation that is accurate may involve complex computations to predict the phenomena. For example, a massive neural network can accurately predict the dependent variables of an experiment given values for the independent variables. The experiment may involve various applications, such as identifying the anomalous performance of batteries or driving behavior. However, the structure of equations using these variables and corresponding parameters makes understanding the scientific theory for the anomalies from the experimental data difficult. In other words, a researcher has difficulty inspecting the network to derive other models for related scientific work, thereby hindering advancement. As such, researchers may use simple regression (e.g., linear, logistic, etc.) to interpret experimental data and derive symbolic expressions at the expense of accuracy.

Moreover, scientific breakthroughs involve the discovery of parsimonious expressions of data having predictive accuracies, such as gravitation laws and Maxwellian equations. Parsimonious expressions may use minimal assumptions or steps for modeling experimental data. A system can derive parsimonious expressions using a model involving genetic programming and domain heuristics that find symmetries in data variables. However, these systems are computationally expensive and produce unintuitive parametric expressions because equations are strings of symbols and the potential strings grow exponentially with the string length.

SUMMARY

In one embodiment, example systems and methods relate to a manner of determining an interpretable model from experimental data using tokenization in a prediction model. In various implementations, systems deriving parametric expressions for scientific experiments with accuracy are complex and produce unintuitive expressions. For example, certain neural networks perform operations that are computationally expensive for producing accurate expressions in various applications (e.g., battery performance, driving behavior, etc.) since potential expressions grow exponentially with additional symbols or parameters. Furthermore, the operations of a neural network can be difficult to understand for deriving other models associated with scientific theory. Therefore, in one embodiment, an observation system uses a model that directly maps experimental data (e.g., tables of battery voltages) to symbolic expressions describing the experimental data through supervised learning. In particular, the observation system uses a feed-forward operation of a neural network (e.g., deep neural network (DNN), perceptron, etc.) that generates and converts tokens representing parts of the symbolic expression. A feed-forward operation simplifies computations by data flowing forward between functional nodes and by avoiding cycling or feedback loops. The observation system parses and fits symbolic parameters from the symbolic expression, such as through regression, to accurately output a symbolic expression. As such, the symbolic expression is interpretable by observing the feed-forward operation and tokens through stages of the computation.

Regarding applications, a user can directly observe and understand the derivation of a determined model. For example, the observation system is applied to potentially defective batteries. Linear tests (e.g., battery cycling) on manufactured batteries can identify unusual behavior as outliers with few actionable insights. Here, the observation system finds an accurate and interpretable model that explains the causes for flagging a new battery as an outlier. An insight from the model may be that an overshoot of the charging curve was due to a manufacturing defect. The insight can also accurately indicate that the effect was merely a testing anomaly.

In one approach, the observation system trains the model by generating variable length and noisy data tables. For example, a parametric expression estimated from an experiment has parameters randomized, sampled, and processed with Gaussian noise to generate a noisy data table. The observation system processes the noisy data table including observed variables and outputs a symbolic expression using the model as supervised learning. In other words, the model trains to produce other models from the experimental data using specialized training data. Accordingly, the observation system improves the derivation and interpretation of symbolic expressions by training and implementing a model that reduces computational complexity, such as through feed-forward computations.

In one embodiment, an observation system for determining an interpretable model from experimental data using tokenization in a prediction model is disclosed. The observation system includes a processor and a memory storing instructions that, when executed by the processor, cause the processor to output a bit pattern of probable tokens generated from raw data using a model. The instructions also include instructions to convert, using the model, the bit pattern into output tokens and parsing the output tokens into a symbolic expression. The instructions also include instructions to fit symbolic parameters from the symbolic expression into an interpretable model for accuracy. The instructions also include instructions to estimate an operational behavior and signal output of a vehicle system according to the interpretable model.

In one embodiment, a non-transitory computer-readable medium for determining an interpretable model from experimental data using tokenization in a prediction model and including instructions that when executed by a processor cause the processor to perform one or more functions is disclosed. The instructions include instructions to output a bit pattern of probable tokens generated from raw data using a model. The instructions also include instructions to convert, using the model, the bit pattern into output tokens and parsing the output tokens into a symbolic expression for accuracy. The instructions also include instructions to fit symbolic parameters from the symbolic expression into an interpretable model. The instructions also include instructions to estimate an operational behavior and signal output of a vehicle system according to the interpretable model.

In one embodiment, a method for determining an interpretable model from experimental data using tokenization in a prediction model is disclosed. In one embodiment, the method includes outputting a bit pattern of probable tokens generated from raw data using a model. The method also includes converting, using the model, the bit pattern into output tokens and parsing the output tokens into a symbolic expression. The method also includes fitting symbolic parameters from the symbolic expression into an interpretable model for accuracy. The method also includes estimating an operational behavior and signal output of a vehicle system according to the interpretable model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed that are associated with determining an interpretable model from experimental data, such as for estimating operational behavior, using tokenization in a prediction model. Systems that derive parametric expressions accurately for scientific observations from experimental data are complex and generate unintuitive expressions. For example, testing systems using neural networks to observe battery behavior in a factory are computationally expensive at producing accurate expressions. A factor that increases complexity is that potential expressions grow exponentially with additional parameters derived for the experimental data. Therefore, in one embodiment, an observation system generates and outputs a bit pattern of probable tokens from experimental data using a model. In one approach, the model is a neural network (e.g., deep neural network (DNN), multi-layer perceptron, recurrent network, etc.) that performs metamodeling by automatically predicting functions that describe relationships from the experimental data through domain (e.g., battery systems, sensor systems, etc.) agnostic transformations. The model may be a prediction model using feed-forward operations that simplify computations by data flowing forward between functional nodes, while avoiding cycling or feedback loops. As such, the model may receive a noisy data table from an experiment as an input and output a symbolic expression that is interpretable for various applications (e.g., battery manufacturing, automated driving, etc.). In particular, the observation system converts the bit pattern into output tokens and parses a symbolic expression accordingly. Here, the output tokens may represent variables, operators, and so on as decimal numbers. Next, the observation system may fit symbolic parameters to refine the symbolic expression before outputting an interpretable and accurate model that is parsimonious (i.e., minimal assumptions, steps, etc.) from the experimental data.

Regarding training, the observation system may generate a synthetic dataset having data tables of varying length and noise levels for end-to-end supervised training. In particular, a neural network may learn to derive accurate symbolic expressions through token-by-token and free-form operations using the synthetic dataset. Here, the data table may be stacked with randomized parameters and variables of a parametric expression having added Gaussian noise as an input for more efficient training. In one approach, the observation system validates the model by running a public dataset from behavior science as supervision. Accordingly, the observation system improves the derivation and interpretation of symbolic expressions by implementing a model that reduces computational complexity through tokenized operations and supervised training.

Figure 1:
FIG. 1 illustrates one embodiment of an observation system that determines an interpretable model of experimental data using tokenization in a model.
Figure 1:
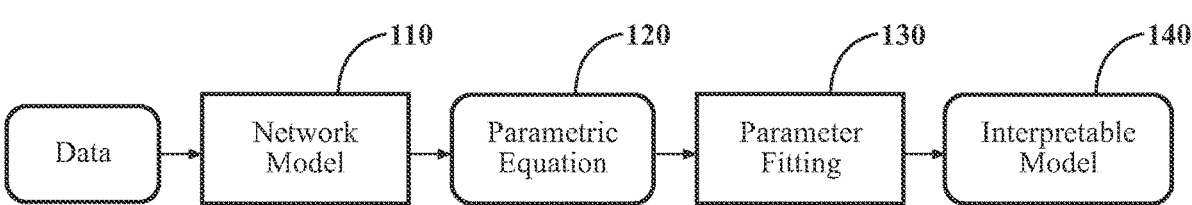

Referring to FIG. 1, an observation system 100 that determines an interpretable model of experimental data using tokenization in a model is illustrated. Here, the network model 110 may be an interpretable model in that a scientist can inspect the mechanics of the network model 110 for composing other models from scientific theory. For instance, the network model 110 may be an inspectable feed-forward neural or perceptron network that processes data in a table form that is collected from an experiment associated with battery systems or vehicle perception systems. The data table may have columns corresponding to independent variables as well as the dependent variable of a potential parametric expression (e.g., battery discharging). For example, suppose an experiment contains the independent variables $x_1$ and $x_2$, and the observation system 100 executes computations to derive the effect of these variables on the dependent variable y. Then, the data table may include observations of variables $x_1$, $x_2$, and y. In one approach, the network model 110 is a neural network that outputs the parametric equation 120 as:

$$y=(w_1x_1+w_2x_2)(w_3x_1+w_4x_2), \qquad \text{Equation (1)}$$

where $\{w_1, w_2, w_3, w_4\}$ are parameters. In some respects, the variables represent placeholders for the data to be modeled, and the parameters represent values to be fitted.

The parameter fitting 130 operation is performed by the observation system 100 as a regression procedure (e.g., linear, polynomial, etc.) to fit values for the parameters $w_i$. The result is in an equational model of the data table. Here, the parameter fitting 130 operation determines specific parameter values since the output from the network model 110 may be crude parameter relationships. For example, the network model 110 outputs $e=mc^2$ without specifying c. As such, Equation (1) using fitting forms:

$$(1.2x_1+3.1x_2)(0.0x_1+0.7x_2). \qquad \text{Equation (2)}$$

The output and interpretable model 140 may then be expressed as:

$$2.17x_2^2 + 0.84x_1x_2. \qquad \text{Equation (3)}$$

The parameters 2.17 and 0.84 may be stored as symbolic parameters 260 for other tasks by the observation system 100.

In various implementations, the observation system 100 may model human behavior. For instance, the observation system 100 models a series of gambles presented to a survey participant. Each gamble corresponds to two possibilities. The first gamble is the possibility of attaining a dollar value $V_1$ with probability $p_1$. The second gamble is a possibility of attaining dollar value $V_2$ with probability $p_2$. A dataset may contain variations of this survey type. For example, the participant will benefit from one gamble in one survey and the next survey participant will benefit from the second gamble. For cases when both gambles are for the survey participant and non-negative $V_1 \geq 0$ and $V_2 \geq 0$, a subjective value (SV) of choices associated with each alternative ($p_i$, $V_i$) may be:

$$SV_i = p_i V_i^+. \qquad \text{Equation (4)}$$

Here, the value a varies from person to person and may be a risk aversion parameter. A higher a is interpreted as a larger risk tolerance. A direct way to model the choice of alternatives is to select the choice with the larger subjective value:

$$\text{choice} = \arg\max(SV_1, SV_2) \qquad \text{. Equation (5)}$$

Moreover, an additional "noise" parameter, $\beta$, which scales a sigmoid, may be added as follows:

$$\text{choice} = \sigma(\beta(SV1 - SV2)) + 1. \qquad \text{Equation (6)}$$

Equation (6) yields a number between 1 and 2, and may be rounded to give a prediction of the choice the participant will make. In this example, the network model 110 processes the dataset, $V_1$, $p_1$, $V_2$, and $p_2$ to derive the interpretable model 140. In particular, the Equation (5) is recovered.

Figure 2:
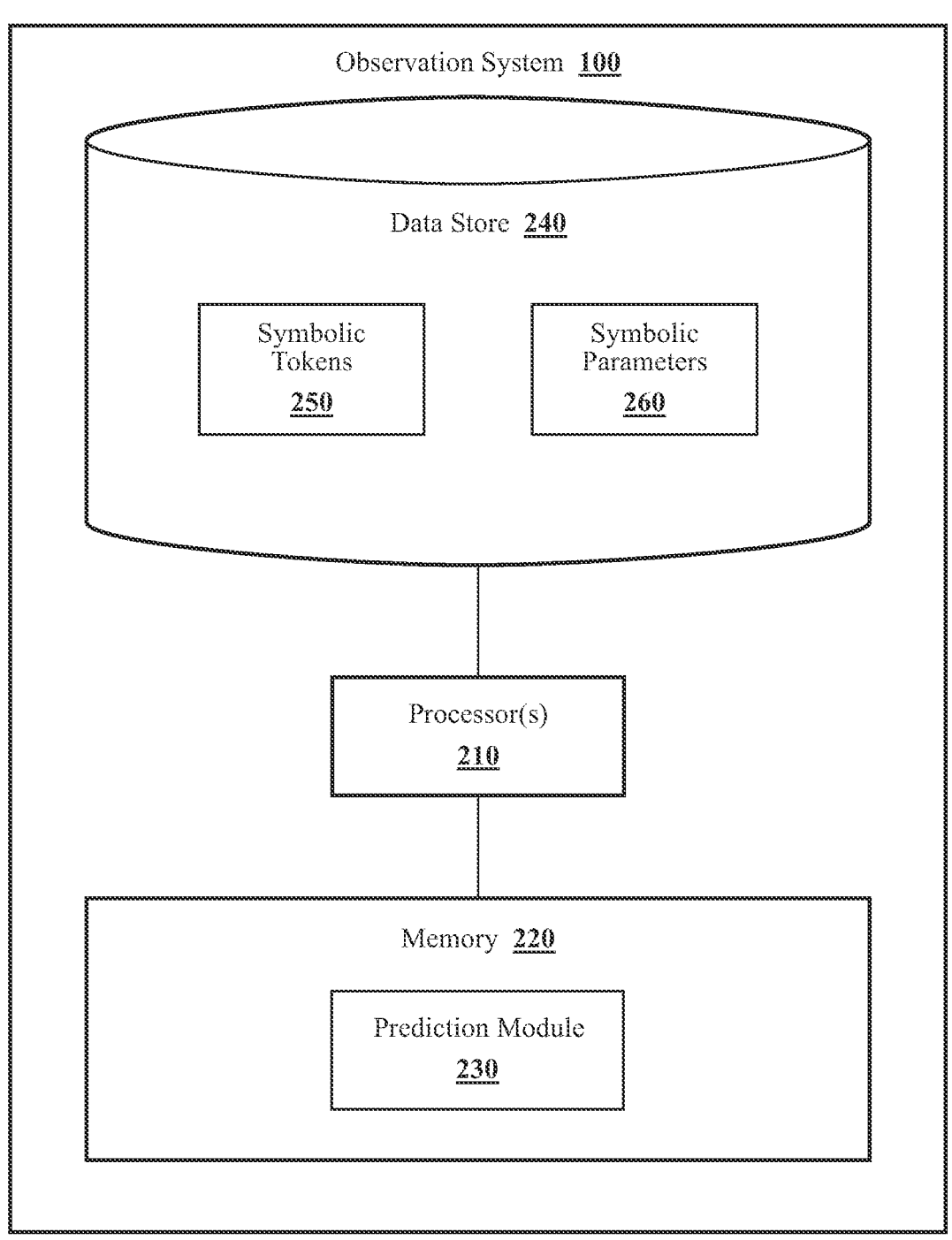
FIG. 2 illustrates one embodiment of the observation system that is associated with deriving an interpretable model of experimental data in a model.

With reference to FIG. 2, one embodiment of the observation system 100 of FIG. 1 is further illustrated. The observation system 100 is generally an abstracted form that may be implemented and includes a processor(s) 210. In one embodiment, the observation system 100 includes a memory 220 that stores a prediction module 230. The memory 220 is a random-access memory (RAM), a read-only memory (ROM), a hard-disk drive, a flash memory, or other suitable memory for storing the prediction module 230. The prediction module 230 is, for example, computer-readable instructions that when executed by the processor(s) 210 cause the processor(s) 210 to perform the various functions disclosed herein.

Moreover, in one embodiment, the observation system 100 includes a data store 240. In one embodiment, the data store 240 is a database. The database is, in one embodiment, an electronic data structure stored in the memory 220 or another data store and that is configured with routines that can be executed by the processor(s) 210 for analyzing stored data, providing stored data, organizing stored data, and so on. Thus, in one embodiment, the data store 240 stores data used by the prediction module 230 in executing various functions.

Figure 3:
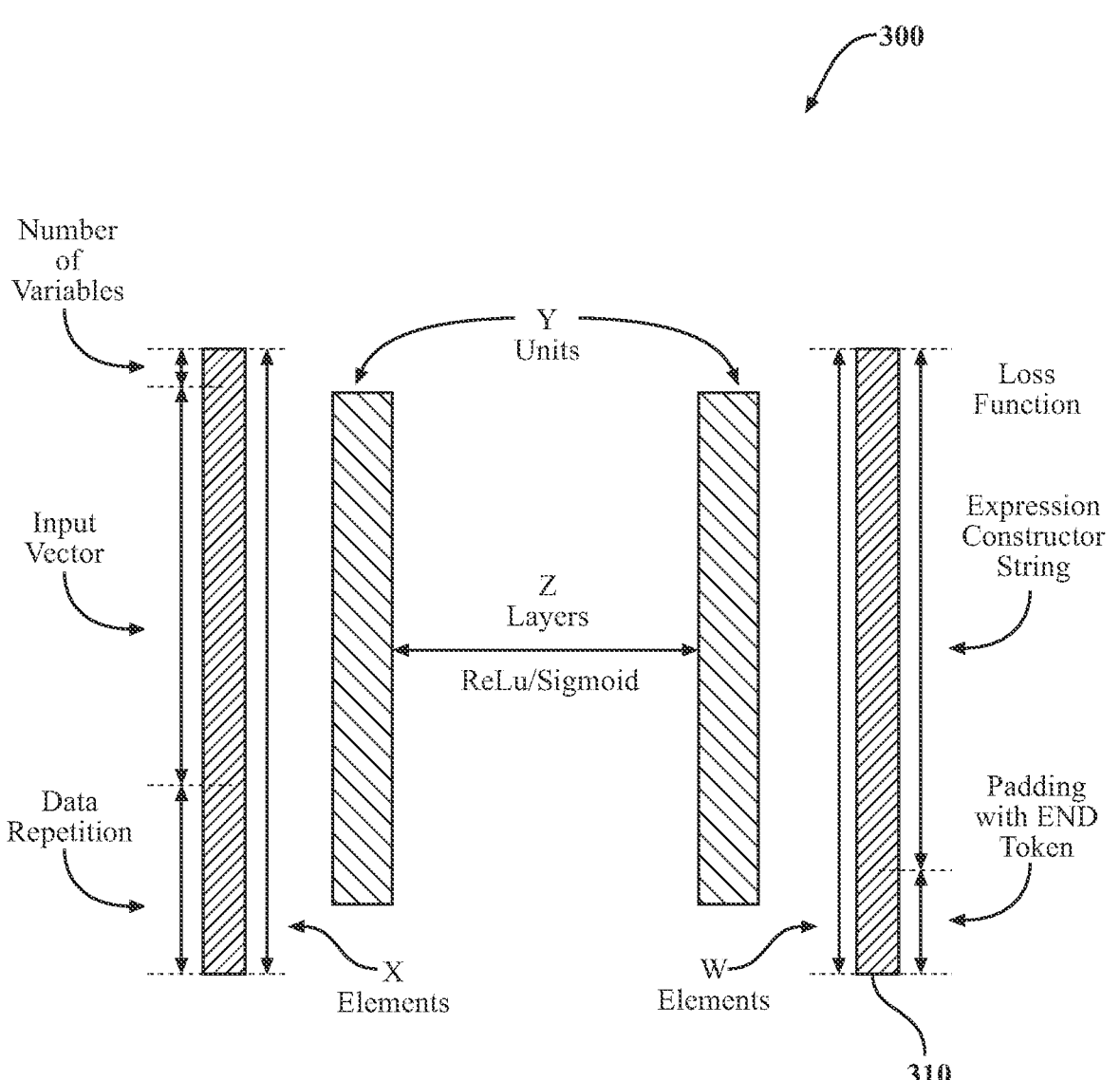
FIG. 3 illustrates an example of a network architecture for the model utilized by the observation system.

In various implementations, the prediction module 230 includes instructions that cause the processor 210 to derive the interpretable model 140 from a data table and variables while avoiding computationally expensive operations (e.g., genetic programming). An example of an interpretable model outputted by the observation system 100 is the parametric equation e=mc² using a feed-forward network, since the derivation is observable. The data table and variables may be processed by the network model 110 using various network architectures. FIG. 3 illustrates an example of a network architecture 300 for the network model 110.

In FIG. 3, X elements may be inputted to a neural network. In one approach, the observation system 100 uses a feed-forward neural network where connections between network nodes avoid cycles or loops. Here, data moves forward between input, hidden, or output nodes without cycles or feedback loops within the network to reduce complex computations. The elements include an input vector in the form of a data table, a number of variables for a potential equation, and a data repetition remainder. The number of variables may be given for the observation system 100 to derive the form of outputted expressions. In various implementations, the data table includes measurements from cycling new batteries for defects. The measurements may include discharge currents, a maximum charge, voltage levels, etc. used by the observation system 100 to predict a life span for the new battery, thereby improving quality control.

Furthermore, both the data table and the data repetition may be obtained by stacking the columns having raw data from an experiment. Here, the observation system 100 may repeat the stacked columns multiple times and truncate the result to yield the X elements since the data tables have variable lengths. In one approach, the network architecture has Z layers (e.g., 10) as input with Y units (e.g., 200). The output may have the same or a different number of layers (e.g., 27) and W elements (e.g., 655). W may represent the number of elements at the end of a range of parametric equations. Elements may be variables, parameters, operators (e.g., sine, cosine, sigmoids, addition, subtraction, etc.) associated with a parametric equation or expression.

Moreover, the non-linearity found among layers in the network architecture 300 for deriving diverse expressions may be from rectified linear units (ReLU) encoders. In one approach, the last layer utilizes a sigmoid non-linearity. The decoder 310 may output an expression construction string associated with a bit pattern. For example, the string may represent $x_1 * x_2$ as "multiplication (operator) with argument $x_1$ and $x_2$." In one approach, the constructed string is converted to tokens that use decimal numbers to represent various elements and stored as symbolic tokens 250. Representations may be addition=1, subtraction=2, and an end token=0. Furthermore, one-hot encoding may also be utilized to convert the expression construction string into a suitable form for machine processing similar to tokenization. As such, the string is encoded and converted to a bit pattern that is a set representing a token.

Regarding training, the network architecture 300 may utilize a loss function that trains through penalties. For example, a binary cross-entropy (BCE) loss function compares a bit pattern outputted to a known expression. The network architecture 300 is adjusted or tuned according to the penalties. In various implementations, the network architecture 300 is a neural network structured as a transformer. In this way, a variable length of outputs instead of a set W can be outputted by the decoder 310 until the final token. In this way, padding with an end token may be foregone.

Figure 4:
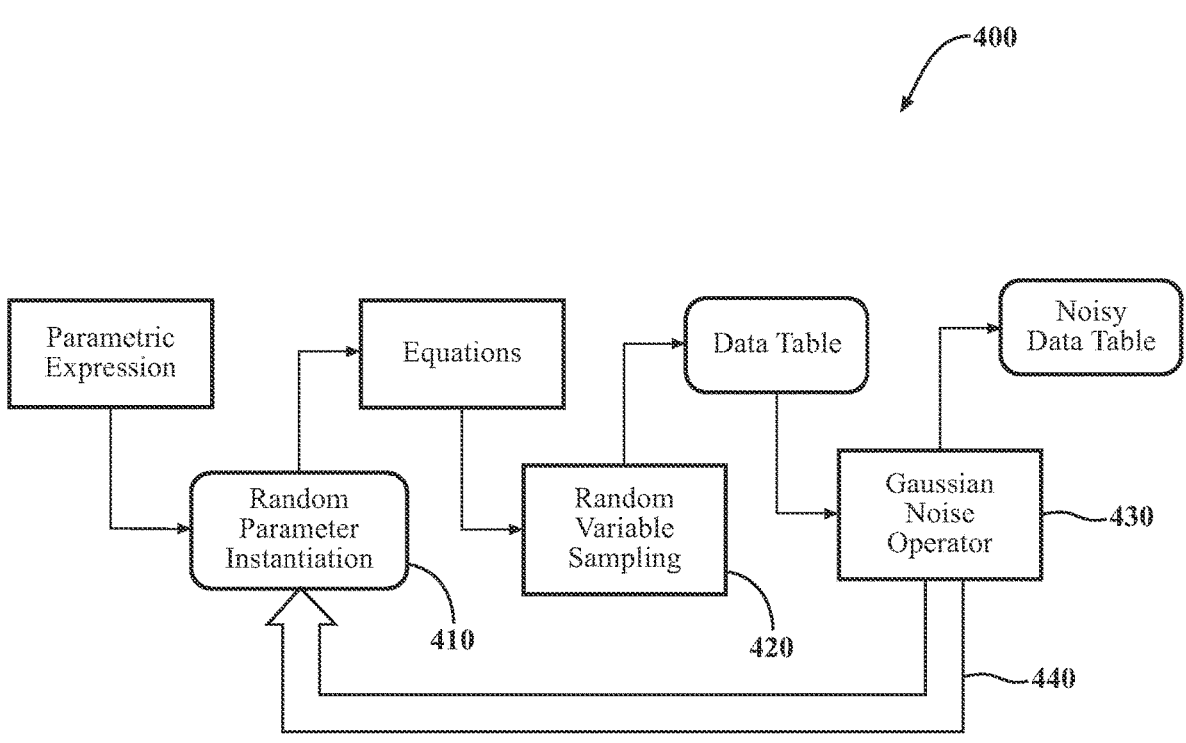
FIG. 4 illustrates one embodiment of generating variable length and noisy data tables for training the network model of the observation system.

FIG. 4 illustrates one embodiment of generating variable length and noisy data tables 400 for training the network model 110 of the observation system 100. A dataset may include a series of symbolic or parametric expressions, including linear and polynomial equations, min/max, arg-min/argmax functions, and so on. The dataset may also include transcendental functions, such as exponentials, logarithms, sigmoids, sines, cosines, and so on. Parametric expressions may be collected according to models from behavioral sciences, and include linear, polynomial, sigmoids, sigmoids of polynomials, sums of polynomials and sigmoids, subjective value equations, and so on. In this way, the observation system 100 trains to model automated driving systems (ADS) involving direct human intervention.

An expression in the dataset may have placeholders for numeric parameters as well as data variables. The random parameter instantiation 410 may randomly select values for the parameters. Next, a data table may be generated for an expression by repeatedly applying random values into the data variables and evaluating the expression associated with random variable sampling 420. Although the operation allows data tables of varying length, in various implementations, a set quantity (e.g., 200) of dependent variables may be utilized. The Gaussian noise operator 430 adds noise to the values of the dependent variables for modeling the effect of measurement noise. A loopback 440 also applies the generated noisy data table to parameter instantiation for improving randomization. For example, negative numbers may represent added noise associated with a sigmoid that ranges between 0 and 1.

In one approach, operations are repeated for a number of noise levels (e.g., 10) associated with each expression. By using various parameter instantiations that are randomly selected, the generating operation produces substantial pairings between noisy data tables and corresponding equations. In this way, the observation system 100 learns a general mapping between data and symbolic structures across parameter values.

Furthermore, the observation system 100 may utilize supervised learning through the generated variable length and noisy data tables 400. Here, the learning computes training and cross-validation losses. Also, training continues past points of increasing cross-validation errors since the percentage of formulas that parse correctly may increase past levels of minimal cross-validation losses. Additional improvements for the observation system 100 include derivations with loose enforcement of grammar for logical formulas. In this way, the network model 110 is tasked with learning the grammar. For example, the training improves the accuracy of predicting grammar by parsing expressions after a certain number of training steps. In this way, the observation system 100 derives models from a wider array of applications and scientific experiments.

Figure 5:
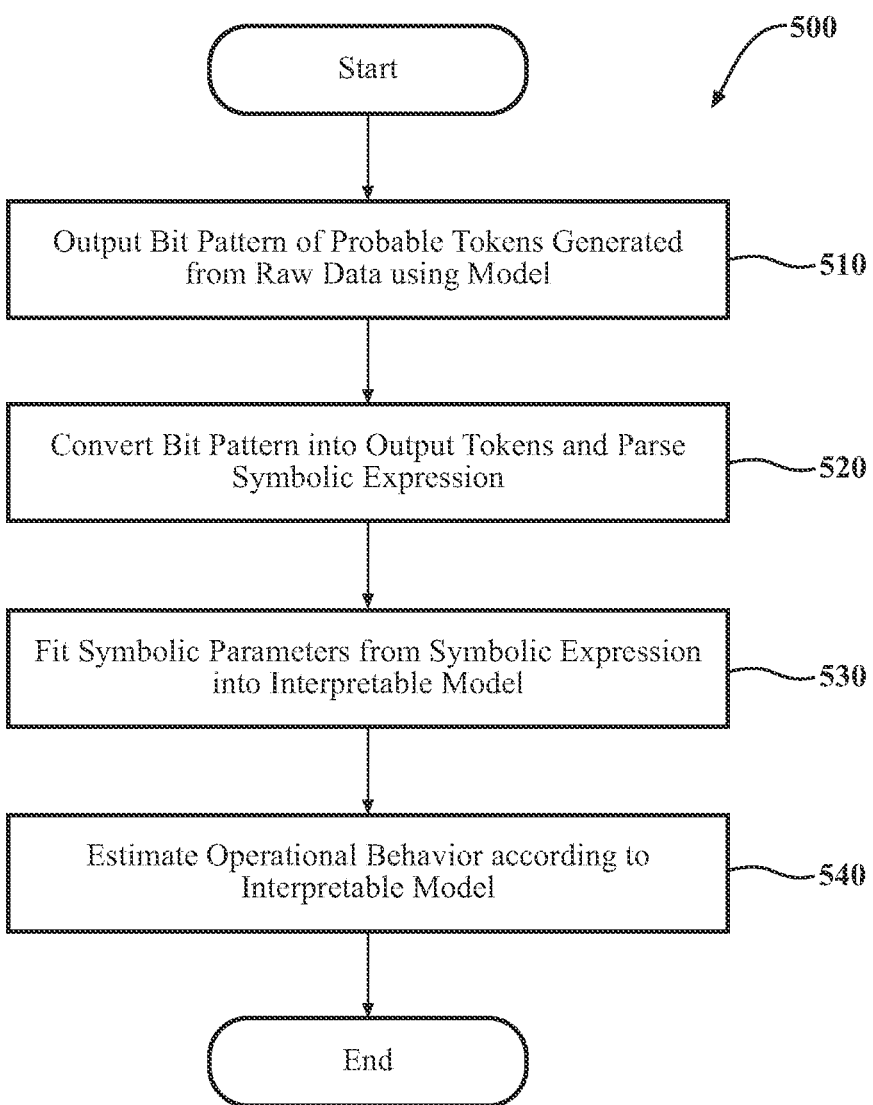
FIG. 5 illustrates one embodiment of a method that is associated with determining an interpretable model of experimental data using tokenization in a model and estimating operational behavior.

Now turning to FIG. 5, a flowchart of a method 500 that is associated with determining an interpretable model from experimental data using tokenization in a prediction model is illustrated. Method 500 will be discussed from the perspective of the observation system 100 of FIGS. 1 and 2. While method 500 is discussed in combination with the observation system 100, it should be appreciated that the method 500 is not limited to being implemented within the observation system 100 but is instead one example of a system that may implement the method 500.

At 510, the observation system 100 outputs a bit pattern of probable tokens generated from raw data using a model. As previously explained, the prediction module 230 utilizes the network model 110 constructed of a feed-forward neural network, perceptron, transformer, and so on to reduce computational complexity. A feed-forward operation may simplify computations by data flowing forward between functional nodes and avoiding cycling or feedback loops.

Moreover, the raw data may be in a data table having columns corresponding to independent variables as well as the dependent variable of a potential parametric expression and include the number of variables. Tokens may be decimal numbers that represent various elements of an expression. For example, representations can include addition=1, subtraction=2, and an end token=0.

At 520, the observation system 100 converts the bit pattern into output tokens and parses a symbolic expression. For example, an expression construction string associated with a bit pattern represents $x_1*x_2$ as "multiplication (operator) with argument $x_1$ and $x_2$." Here, the conversion may involve having a set of tokens represented in bits that the observation system parses to derive $x_1*x_2$ and associated parameters. As explained above, similar operations are performed to derive $y=(w_1 \ x_1+w_2x_2)(w_3x_1+w_4x_2)$ from an experiment (e.g., battery testing, perception systems) having the independent variables $x_1$ and $x_2$ and dependent variable y.

Regarding fitting, at 530 the observation system 100 fits symbolic parameters from the symbolic expression into an interpretable model. In one approach, the observation system 100 executes parameter fitting to determine specific parameter values since the output from the network model 110 has crude parameter relationships. For example, the network model 110 outputs $e=mc^2$ without specifying c. As such, the parameter fitting operation may use a regression procedure (e.g., linear, polynomial, etc.) to fit values for c when deriving $e=mc^2$.

Regarding applications, at 540 the observation system 100 estimates the operational behavior of a system according to the interpretable model. Here, the derivation by the observation system 100 and/or prediction module 230 is an interpretable model in that a scientist can inspect the mechanics of the network model 110 for composing other models from scientific theory. For instance, the network model 110 may be an inspectable feed-forward neural or perceptron network.

In various implementations, the raw data represents test results from newly manufactured batteries. The observation system 100 uses the raw data to identify causes for unusual battery behavior. An un-interpretable black-box model (e.g., DNN) can identify unusual behavior as outliers with few insights and crude accuracy. Here, the observation system 100 finds an accurate and interpretable model that explains the causes for flagging a battery as an outlier. For example, an insight from the interpretable model is that an overshoot of the charging curve was caused by a manufacturing defect. The insight can also accurately indicate that the effect was merely a testing anomaly with battery lifespan unaffected.

The observation system 100 can also model raw data to understand operator behavior on the road. For example, an ADS estimates motion according to the intent of other traffic participants (e.g., pedestrians, other vehicles, etc.). A black-box model (e.g., DNN) may be accurate but uninterpretable since inspection or direct observation is difficult. A linear model may be interpretable but have low accuracy. The observation system 100 derives an accurate yet interpretable model to understand the characteristics of traffic behaviors, including those which are likely to cause ADS mistakes.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an application-specific integrated circuit (ASIC), a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., an ASIC), an analog circuit, a digital circuit, a programmed logic device, a memory device including instructions that, when executed perform an algorithm, and so on. A module, in one or more embodiments, includes one or more complementary metal-oxide silicon (CMOS) gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An observation system to improve model derivations, comprising:
  a processor; and
  a memory storing instructions that, when executed by the processor, cause the processor to:
    output a bit pattern of probable tokens generated from raw data using a model;
    convert, using the model, the bit pattern into output tokens and parse the output tokens into a symbolic expression;
    fit symbolic parameters from the symbolic expression into an interpretable model; and
    estimate an operational behavior and a signal output of a vehicle system according to the interpretable model.

2. The observation system of claim 1, further including instructions to compute, by the model using a transformer, a variable number of the output tokens up to an end token associated with the symbolic expression.

3. The observation system of claim 1, further including instructions to:
  compute a data table according to an equation with randomized parameters that are sampled and includes Gaussian noise; and
  train the model using the data table that is stacked and includes the randomized parameters and variables of the equation as an input for accuracy.

4. The observation system of claim 1, wherein the instructions to estimate the operational behavior and the signal output of the vehicle system further include instructions to predict a lifespan of a vehicle battery using the interpretable model, wherein the interpretable model has a set length of the symbolic parameters.

5. The observation system of claim 1, wherein the probable tokens are decimal numbers that represent one of variables, constants, operators, and observed parameters associated with the interpretable model.

6. The observation system of claim 1, wherein a set within the bit pattern each represents one of the output tokens.

7. The observation system of claim 1, wherein the symbolic parameters are constants of the symbolic expression.

8. A non-transitory computer-readable medium comprising:
  instructions that when executed by a processor cause the processor to:
    output a bit pattern of probable tokens generated from raw data using a model;
    convert, using the model, the bit pattern into output tokens and parsing the output tokens into a symbolic expression;
    fit symbolic parameters from the symbolic expression into an interpretable model; and
    estimate an operational behavior and a signal output of a vehicle system according to the interpretable model.

9. The non-transitory computer-readable medium of claim 8, further including instructions to compute, by the model using a transformer, a variable number of the output tokens up to an end token associated with the symbolic expression.

10. The non-transitory computer-readable medium of claim 8, further including instructions to:
  compute a data table according to an equation with randomized parameters that are sampled and includes Gaussian noise; and
  train the model using the data table that is stacked and includes the randomized parameters and variables of the equation as an input for accuracy.

11. The non-transitory computer-readable medium of claim 8, wherein the instructions to estimate the operational behavior and the signal output of the vehicle system further include instructions to predict a lifespan of a vehicle battery using the interpretable model, wherein the interpretable model has a set length of the symbolic parameters.

12. The non-transitory computer-readable medium of claim 8, wherein the probable tokens are decimal numbers that represent one of variables, constants, operators, and observed parameters associated with the interpretable model.

13. The non-transitory computer-readable medium of claim 8, wherein a set within the bit pattern each represents one of the output tokens.

14. A method comprising:
  outputting a bit pattern of probable tokens generated from raw data using a model;
  converting, using the model, the bit pattern into output tokens and parsing the output tokens into a symbolic expression;
  fitting symbolic parameters from the symbolic expression into an interpretable model; and
  estimating an operational behavior and a signal output of a vehicle system according to the interpretable model.

15. The method of claim 14, further comprising computing, by the model using a transformer, a variable number of the output tokens up to an end token associated with the symbolic expression.

16. The method of claim 14, further comprising:
  computing a data table according to an equation with randomized parameters that are sampled and include Gaussian noise; and
  training the model using the data table that is stacked and includes the randomized parameters and variables of the equation as an input for accuracy.

17. The method of claim 14, wherein estimating the operational behavior and the signal output of the vehicle system further includes predicting a lifespan of a vehicle battery using the interpretable model, wherein the interpretable model has a set length of the symbolic parameters.

18. The method of claim 14, wherein the probable tokens are decimal numbers that represent one of variables, constants, operators, and observed parameters associated with the interpretable model.

19. The method of claim 14, wherein a set within the bit pattern each represents one of the output tokens.

20. The method of claim 14, wherein the symbolic parameters are constants of the symbolic expression.

* * * * *